Feb. 3, 1959 G. W. KILLIAN 2,872,526
SELECTOR SWITCH CIRCUIT
Filed April 18, 1957
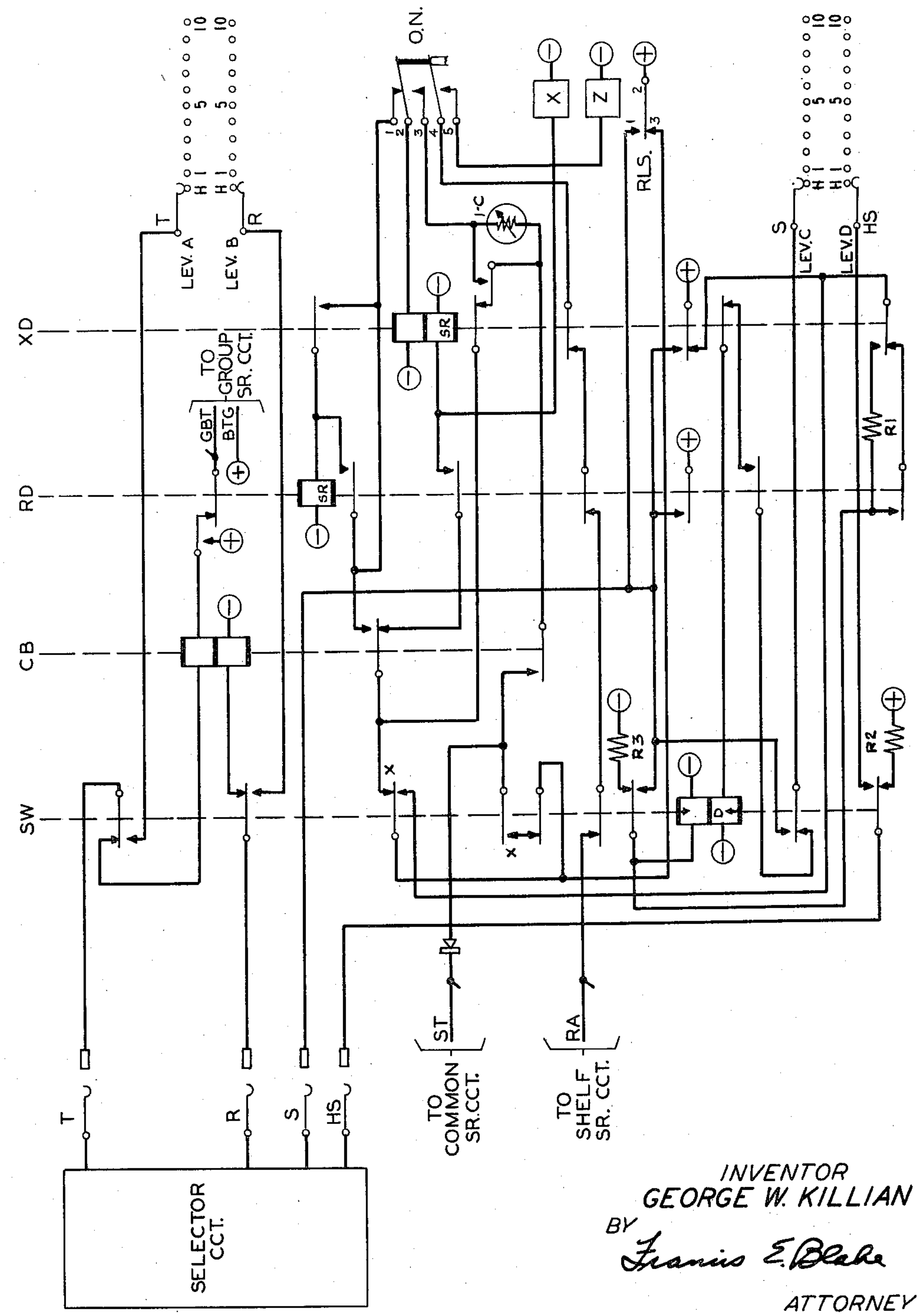
INVENTOR
GEORGE W. KILLIAN
BY Francis E. Blake
ATTORNEY 2,872,526
Patented Feb. 3, 1959

2,872,526

SELECTOR SWITCH CIRCUIT

George W. Killian, Rochester, N. Y., assignor to General Dynamics Corporation, Rochester, N. Y., a corporation of Delaware Application April 18, 1957, Serial No. 653,549

5 Claims. (Cl. 179—18)

This invention relates to switching systems and particularly to circuit arrangements for the control of step by step switches employed in telecommunication systems.

The object of the invention is economy and simplicity, the novel aspects thereof residing in the arrangements whereby the amount of apparatus employed is reduced through the assignment of double duties to certain of the heretofore conventional relays.

In accordance with the present invention the conventional cut through relay of a selector switch heretofore employed under control of a busy test relay to complete the through circuits of such a switch when the test relay determines that the line seized is free and capable of employment, is now made to carry out both functions, that of testing the seized line and transmitting a busy signal if the line is busy and that of cutting through the circuits from the incoming to the outgoing terminals thereof if the line is idle. For the purposes of this invention a two step relay is employed, that is a relay provided with certain armatures which respond to a weak energization of the magnetic circuit thereof and which conventionally close another energizing circuit for the relay which will produce a strong energization sufficient to operate a plurality of heavy duty armatures.

In accordance with the present invention the relay is provided with a pair of differentially wound coils, one of which is located in a busy test circuit. If the seized line is idle, then this busy test coil is not energized and the relay is strongly energized through its other coil, but if the seized line is busy then such busy test coil is energized to oppose the energization of the other coil to the end that the relay will be only weakly energized and only its very sensitive armatures will be operated. In either case the circuits for the relay are thereupon rearranged so that the energization of the relay cannot thereafter be changed, that is, if the relay is only weakly energized and only its X contacts are operated, its operation cannot thereafter be changed to a strong operation.

Conventionally, a calling bridge relay is provided for response to the bridge controlled by a calling subscriber, a release delay relay is provided for response to the calling bridge relay and for holding over the short deenergizations thereof constituting the dial pulses and a stepping delay relay having slow release characteristics is provided for operation during the stepping operation and for holding over during the pulsing and for releasing thereafter to signal the termination of the stepping. It is conventional for the calling bridge relay and the release delay relay to remain operated thereafter under control of the calling subscriber until the cut through relay is operated.

In accordance with the present invention, when the cut through relay responds to a busy condition and operates only its sensitive armatures it causes the release delay relay to be released and the stepping delay relay (in a circuit independent of the stepping magnet) to be reoperated to close a busy signal circuit to the calling subscriber and to rearrange the circuits of the switch to be unresponsive to the calling subscriber's control except for release.

A feature of the invention is a differentially wound two step relay responsive to the conjoint energization of both windings to move only the sensitive armatures thereof and alternatively responsive to the energization of but a single winding to move all the armatures thereof. Such a relay having its differential winding in a busy test circuit will respond in one manner as a test relay and in another manner as a cut through relay.

Another feature of the invention is a two step relay in a circuit responsive to its operation in either of two ways to prevent any alteration in its operation thereafter. In accordance with this feature, the relay when operated in either of these two ways will carry out its function undisturbed, that is, when its sensitive armatures alone have been operated by a weak energization of the relay no further circuit change may be made to cause a strong energization to additionally operate the remainder of the armatures and likewise when the relay has been initially strongly energized to operate all of its armatures no further circuit change may be made to revert to a weak energization thereof. Whereas the conventional two step relay is arranged to normally establish a strong energization upon and by the operation of its sensitive armature, the relay of the present invention is included in a circuit arrangement whereby this conventional operation may be prevented. Thus the relay of the present invention is included in a circuit arrangement whereby the weak or the strong energization may be maintained unchanged thereafter.

Another feature of the invention is a circuit arrangement conventionally responsive to a calling bridge circuit and including a first slow relay in which said first slow relay is released upon the encounter of a busy line whereby the circuit is disabled to respond thereafter to any operation by the calling subscriber other than to release.

Other features will appear hereinafter.

The drawings consist of a single sheet having a single figure in the form of a schematic circuit diagram showing the circuit of a selector switch embodying the present invention.

In operation, the selector of the present invention is seized in a conventional manner. If the selector is idle, the sleeve S will be found clear, that is neither ground nor battery will be connected thereto. If the selector is engaged, ground will be connected to the sleeve either from a front contact of the RD relay or a front contact of the XD relay as will be described more in detail hereinafter. Assuming the selector to be idle so that the selector through which this device is selected brings its brushes to rest on the T, R, S and HS terminals, a circuit will be closed from the loop connected to the T and R terminals to the windings of the calling bridge relay CB. The upper winding of the CB relay is at first connected to ground over the GBT lead, but is immediately connected to ground over a front contact of the RD relay.

Upon the operation of the CB relay, a circuit from ground, the armature and back contact of the release magnet Z, an armature and back contact of the SW relay, an armature and front contact of the CB relay, a normally closed off normal switch contact and the upper winding of the XD relay to battery will result in the operation of the XD relay. This relay will extend the ground before the off normal contacts to the winding of the RD relay and the RD relay in operating will lock directly to this ground. Both the XD relay and the RD relay in turn will ground the sleeve conductor S to mark the selector as busy. The RD relay prepares a circuit through the lower winding of the XD relay and a back contact of the CB relay to maintain the XD relay operated during dialing after the off normal contacts have been opened on the first movement of the selector brushes.

It will be noted that the switch magnet X is connected in parallel with the lower winding of the XD relay so that when the CB relay responds to dial pulses the switch magnet will follow and will move the brushes to a corresponding set of outgoing terminals for any conventional purpose.

At the end of the train of dial pulses the sleeve brush of the selector will be connected through an armature and back contact of the SW relay, an armature and front contact of the RD relay and when the XD relay releases in an interval measured by its slow releasing characteristics through a back contact and armature thereof through the lower differentially wound winding of the SW relay to battery. At the same time a circuit will be established from ground, an armature and back contact of the XD relay, another armature and back contact of the XD relay, an armature and front contact of the RD relay to a point where the circuit divides, one branch leading through the upper winding of the SW relay to battery and the other branch leading through an armature and back contact of the SW relay and a resistor $R_3$ to battery. Thus the upper winding of the SW relay is simultaneously energized with the lower winding so that if the circuit reached by the switch is busy the SW relay will be weakly energized due to the differential but unequal windings thereof. This will result in the operation of the X armatures of the SW relay only. If on the other hand the circuit reached by the switch is idle, then the upper winding of the SW relay only will be energized and this will result in the movement of all the armatures of the SW relay which will thereupon connect its upper winding directly to the sleeve ground and open the circuit to its lower winding so as to remain strongly energized thereafter until the switch is released.

Assuming the circuit reached to be idle, then the SW cut through relay will operate and cut the T and R leads directly through to the T and R outgoing brushes of the switch. A circuit will then be established from a ground controlled by the release magnet, an X armature of the SW relay, an armature and back contact of the XD relay, an armature and front contact of the RD relay and thence through the upper winding of the SW relay to battery.

Since the operation of the SW relay releases the CB relay, the RD relay will be released and this will also release the XD relay so that during the conventional use of the switch only the SW relay will remain operated and this will be under control of a ground on the S conductor supplied by the succeeding circuit before the RD relay releases.

When the use of the switch has been completed, ground on the sleeve will be removed conventionally, the SW relay will be released and a circuit for the release magnet Z will be completed from the common RA terminal through a back contact and armature of the SW relay, back contacts and armatures of the RD and XD relays and a pair of the off normal contacts to the winding of the Z magnet to battery. The switch will thus be returned to normal.

Assuming the circuit reached by the selector switch of the present invention to be busy, then only the X armatures of the SW relay will operate. The ground for the RD relay will be opened and this relay in a short interval measured by its slow releasing characteristics will release. In the meantime, however, the ground supplied by the armature and back contact of the release magnet Z will be extended through an unoperated armature and back contact of the SW relay and a front contact and operated X armature thereof, a front contact and armature of the CB relay, a thermistor 1–C, a pair of off normal contacts and the upper winding of the XD relay to battery. This ground also acts to hold the RD relay until the XD relay can be operated. When the thermistor heats sufficiently, the XD relay will operate and the RD relay will be released. The operation of the XD relay will shortcircuit the thermistor so that the XD relay may be held under control of the CB relay.

It is to be noted that upon the release of the RD relay, the circuit for the lower winding of the SW relay is opened, but the X armatures of this relay are held operated by the upper winding thereof in series with the $R_1$ resistance, the X armatures of the SW relay and the ground at the back contact of the release magnet contacts. Thus the sleeve wiper of the switch is freed from this circuit after a busy test has been made.

Upon the release of the RD relay the upper winding of the CB relay will be cut into the busy tone circuit so that the calling subscriber will be notified of the busy condition encountered. Upon the release of the CB relay the XD relay will be released and as the ground is removed from the sleeve wire, the circuit will be returned to normal.

What is claimed is:

1. In a selector switch circuit, a two step relay having a pair of windings differentially wound with regard to each other, a plurality of contacts operated by a strong energization of said relay by a single one of said windings and including a certain of said contacts capable of also being operated by a feeble energization of said relay by the conjoint operation of both said windings, one of said windings terminating in a busy test circuit.

2. In a selector switch circuit, a two step relay having a pair of windings differentially wound with regard to each other, a plurality of contacts operated by a strong energization of said relay by a single one of said windings and including certain of said contacts capable of also being operated by a feeble energization of said relay by the conjoint operation of both said windings, one of said windings terminating in a busy test circuit, and locking circuits controlled by said contacts for preventing a different operation of said relay subsequent to its said operation in either manner.

3. In a selector switch circuit, a two step relay having a pair of windings differentially wound with regard to each other, a plurality of contacts operated by a strong energization of said relay by a single one of said windings and including certain of said contacts capable of also being operated by a feeble energization of said relay by the conjoint operation of both said windings, one of said windings terminating in a busy test circuit, locking circuits controlled by said contacts for preventing a different operation of said relay subsequent to its said operation in either manner, a calling bridge relay, a release delay relay responsive to said calling bridge relay and a stepping delay relay normally released after the receipt of a train of dial pulses by said calling bridge relay, and circuits controlled by said certain contacts for releasing said release delay relay and for reoperating said stepping delay relay and means controlled by said released release delay relay for connecting a source of busy tone to said calling bridge relay.

4. In a selector switch circuit, a two step relay having a pair of windings differentially wound with regard to each other, a plurality of contacts operated by a strong energization of said relay by a single one of said windings and including certain of said contacts capable of also being operated by a feeble energization of said relay by the conjoint operation of both said windings, one of said windings terminating in a busy test circuit, locking circuits controlled by said contacts for preventing a different operation of said relay subsequent to its said operation in either manner, a calling bridge relay, a release delay relay responsive to said calling bridge relay and a stepping delay relay normally released after the receipt of a train of dial pulses by said calling bridge relay, circuits controlled by said certain contacts for releasing said release delay relay and for reoperating said stepping delay relay, means controlled by said released release delay relay for connecting a source of busy tone to said calling bridge relay and means controlled by said contacts responsive to a strong energization of said two step relay for cutting through said selector switch circuit and releasing said calling bridge relay, said release delay relay and said stepping delay relay.

5. In a selector switch circuit, a two step relay having a pair of windings differentially wound with regard to each other, circuitry effective upon the operation of said switch into connection with a desired called line for energizing a first of said windings regardless of the idle or busy condition of said called line and for additionally energizing the second of said windings only in the event that the said called line is busy, sensitive armatures operated by said relay under said latter condition wherein both said windings become simultaneously energized, and other armatures additionally operated by said relay under the first of said conditions wherein said first of said windings alone becomes energized and circuitry controlled by the said armatures of said relay for preventing the conjoint energization of said two windings after said relay has been strongly energized by said first winding alone and alternatively for maintaining the conjoint energization of said two windings after said relay has been feebly energized by the simultaneous energization of said two windings.

No references cited.